US006343989B1

(12) United States Patent
Wood et al.

(10) Patent No.: US 6,343,989 B1
(45) Date of Patent: Feb. 5, 2002

(54) METHOD OF TRACKING AND USING PLAYER ERROR DURING THE PLAY OF A CASINO GAME

(75) Inventors: Michael W. Wood, Denham Springs; Terry L. Wilson, Prairieville, both of LA (US)

(73) Assignee: Micheal W. Wood, Baton Rouge, LA (US)

( * ) Notice: Subject to any disclaimer, the term of this patent is extended or adjusted under 35 U.S.C. 154(b) by 0 days.

(21) Appl. No.: 09/532,388

(22) Filed: Mar. 22, 2000

(51) Int. Cl.[7] .............................................. A63F 13/00

(52) U.S. Cl. ............................ 463/23; 463/25; 463/42; 273/292

(58) Field of Search ............................ 463/1, 9, 11–13, 463/16, 22, 25, 26, 27, 40, 42; 273/138.1, 138.2, 139, 292, 293, 309, 236, 237, DIG. 26; 700/91–93; 340/323 R

(56) References Cited

U.S. PATENT DOCUMENTS 5,401,023 A * 3/1995 Wood

* cited by examiner

*Primary Examiner*—Mark Sager
(74) *Attorney, Agent, or Firm*—John Edward Roethel

(57) ABSTRACT

A player makes a wager and a starting five card video poker hand is displayed to the player. The computer controls of the gaming machine calculate the highest expected value (highest $TEV_i$) for the five card hand displayed. The player selects which cards, if any, the player wishes to hold. The computer controls then calculate the expected value of the hand as played by the player (player $TEV_i$). The difference between the highest $TEV_i$ and the player $TEV_i$ is also calculated (highest $TEV_i$—player $TEV_i$). This difference is multiplied by the amount of the player's wager and the resultant amount is the error made by the player. The error is accumulated over one or more rounds of play and the accumulated error amount may be returned to the player in a variety of ways, either directly or indirectly.

10 Claims, 1 Drawing Sheet

METHOD OF TRACKING AND USING PLAYER ERROR DURING THE PLAY OF A CASINO GAME

This invention relates to casino games, and more particularly to a method of tracking errors made by a player during the play of the game. The errors can be quantified and used by the gaming establishment in a variety of ways including directly or indirectly returning the accumulated monetary value of the errors to the player.

BACKGROUND OF THE INVENTION

Casino games come in a variety of embodiments. There are the wager and spin games, such as reel or video slot machines, in which no player decision is required to effect the outcome of the game. The player simply makes a wager, pulls the handle or presses the SPIN button on the slot machine and the outcome is displayed to the player. The player has no control or input into the outcome of the game and the player wins or loses simply on the basis of a random event. The player cannot make a mistake or error that will affect the outcome of a game such as a slot machine.

There are other casino games in which the player has a modest input in the result of the game. In games such as Roulette or Keno, the player makes a wager and then selects one or more numbers that the player hopes will occur during the play of the game. The winning number or numbers are then randomly selected and winning and losing events are determined. While the player does have input at the beginning of each round of play, the outcome of the game is independent of any action or decision making by the player.

However, there are many casino games in which decision making by the player does affect the outcome of the game. Typical of these types of games is video draw poker. A player makes a wager to be eligible to play the game. After an initial deal of five cards is displayed to the player on a video display screen, the player is allowed to discard and replace unwanted cards with replacement cards. The player attempts to achieve the highest possible poker hand from the starting five cards. Video poker games use poker hand rankings to determine winning combinations and a payout schedule is used to determine the amount awarded to the player for achieving a winning combination.

Players often make mistakes in analyzing the starting five cards and determining which cards to hold and which cards to discard. Player also make mistakes by pressing the wrong buttons or by playing too fast and not recognizing which cards the player actually has a starting cards.

Casino games such as video draw poker offer the player a pay table that is based on the mathematical probabilities of the game being played. If the player were to play the game without making any strategy mistakes or other misplays of each hand, the gaming machine would return to the player over the long run the calculated mathematical game return based on the pay table presented to the palyer. Misplays of game strategy and other player errors lower the game return and diminish the player's chances of possibly having a winning session at the gaming machine.

It is possible to determine mathematically how a player should play each hand of cards that is presented to the player so that the player can have the best possible chance of maximizing the game return of the gaming machine being played. One well known way of determining player strategy is to calculate the highest expected value for each starting hand dealt to the player. The player then plays his hand in accordance with the strategy that has the highest expected value for the pay table being offered to the player. Players who are capable of recognizing the best way to play each starting hand have the best chance to have a winning session at the gaming machine.

However, most players are not capable of recognizing the best way to play each and every starting hand that a player is dealt in a game of video draw poker. Invariably, players will commit errors in playing each hand and the gaming establishment presently simply benefits from the errors made by the player in that the actual game return of the gaming machine is higher than the theoretical game return of the gaming machine had the player not made errors during the play of the game.

It is an object of the present invention to provide a method of determining the errors made by a player during the play of a casino game, calculating the affect of those errors on the game return and returning those errors to the player either directly or indirectly.

It is a feature of the present invention to analyze each starting hand of a game of chance played on a gaming machine and determine the highest expected value of the starting hand. The expected value of the starting hand as then played by the player is also determined and compared to the highest expected value of the starting hand. The difference, if any, is the error made by the player. The monetary value of the difference is accrued and returned to the player, either directly or indirectly.

It is an advantage of the present invention that the player has a fairer play of the gaming machine since any errors committed by the player during the play of the game are returned to the player. A player would be less reluctant to play a game of chance that the player was not totally comfortable with because any errors made by the player would be returned to the player over the course of playing the game. The gaming establishment would benefit from having more players and a higher volume of play.

Other objects, features and advantages of the present invention will become apparent from a consideration of the following detailed description.

SUMMARY OF THE INVENTION

A player makes a wager and a starting five card video poker hand is displayed to the player. The computer controls of the gaming machine calculate the highest expected value (highest $TEV_i$) for the five card hand displayed. The player selects which cards, if any, the player wishes to hold. The computer controls then calculate the expected value of the hand as played by the player (player $TEV_i$). The difference between the highest $TEV_i$ and the player $TEV_i$ is also calculated (highest $TEV_i$—player $TEV_i$). This difference is multiplied by the amount of the player's wager and the resultant amount is the error made by the player. The error is accumulated over one or more rounds of play and the accumulated error amount may be returned to the player in a variety of ways, either directly or indirectly.

DETAILED DESCRIPTION OF THE PREFERRED EMBODIMENTS

Figure 1:
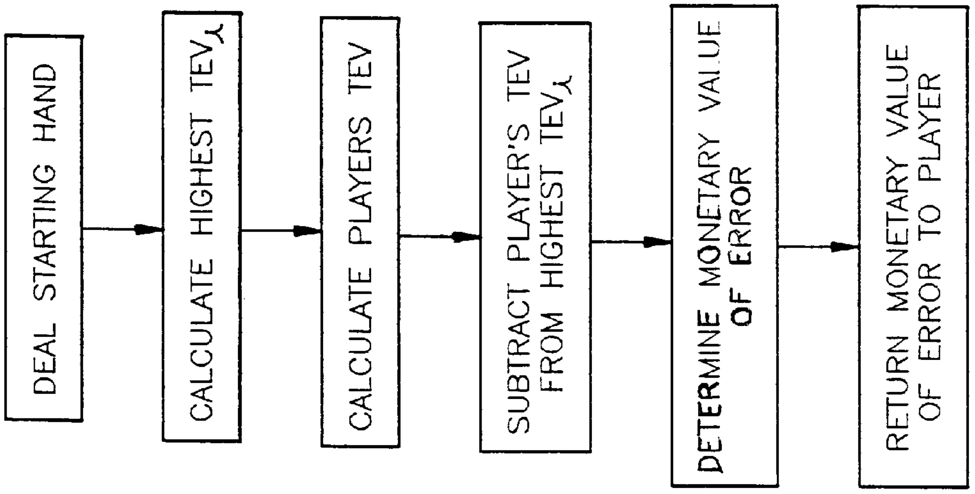
FIG. 1 shows a flow chart of the method of the present invention.

The method of the present invention involves calculating player error that occurs during a game of chance, accruing the player error and returning the player error to the player in any of a variety of ways.

In any game of chance in which the player is required to make a decision on how to play the game, the possibility of player error exists. Typical of games of chance in which player error can occur are the various iterations of draw poker. In each of these games, it is possible to calculate mathematically the optimal manner of playing the initially dealt cards to achieve the highest expected value. It is also possible to calculate mathematically the expected value of how the player actually plays the initially dealt cards. Any difference between the optimal manner of play and the way the player plays the initially dealt cards is the player error. The monetary value of the player error based on the amount wagered by the player can be accrued and the accumulated monetary value of the player error can be returned to the player in any of a variety of ways.

FIG. 1 shows a flow chart of the steps of the method of the present invention.

In draw poker, the player makes a wager to play the game. When draw poker is played on an electronic gaming machine, an initial five card video poker hand is displayed to the player. This hand is randomly selected from the fifty-two cards that comprise a standard deck of playing cards. The player may hold or discard each, any or all of these initial five cards. Mathematically, there are thirty two possible ways ($2^5=32$) for a player to play this initial five card hand. Thus, the number of possible discard strategies (i) is thirty-two.

The computer controls of the gaming machine are programmed to calculate the highest expected value (highest $TEV_i$) for the initial five card hand displayed. This is done by analyzing all thirty-two possible discard strategies and calculating the expected value for each of the possible discard strategies. The expected value for each discard strategy is calculated using Formula #1:

Formula #1:

$$TEV_i = \sum_{n=1}^{N} P_{ni} \times Award_n$$

where:

$TEV_i$ is the Total Expected Value of awards paid for the $i^{th}$ discard strategy.

N is the winning hand types; this corresponds to the number of possible distinct winning categories.

$P_{ni}$ is the probability of winning the $n^{th}$ Award, given the dealt hand at the $i^{th}$ discard strategy.

$Award_n$ is the Pay for the $n^{th}$ winning combination.

As can be seen from Formula #1, the calculation of the expected value for each possible discard strategy is dependent on the awards paid to the player for achieving winning hand combinations. In draw poker, the awards to the player are represented by winning hand combinations displayed to the player in a pay table.

As an example of how these calculations work, assume the player receives the following initially dealt five card hand:

KING♠KING♦ TEN♥ JACK♥ QUEEN♥

Also for this example, assume the player is playing a draw poker game of the format of Bonus Poker in which the pay table presented to the player is shown in Table 1:

TABLE 1

| BONUS POKER | NUMBER OF COINS BET | | | | |
|---|---|---|---|---|---|
| POKER HAND | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR ACES | 80 | 160 | 240 | 320 | 400 |
| FOUR 2'S, 3'S OR 4'S | 40 | 80 | 120 | 160 | 200 |
| FOUR 5'S THRU KINGS | 25 | 50 | 75 | 100 | 125 |
| FULL HOUSE | 8 | 16 | 24 | 32 | 40 |
| FLUSH | 5 | 10 | 15 | 20 | 25 |
| STRAIGHT | 4 | 8 | 12 | 16 | 20 |
| THREE-OF-A-KIND | 3 | 6 | 9 | 12 | 15 |
| TWO PAIR | 2 | 4 | 6 | 8 | 10 |
| JACKS OR BETTER | 1 | 2 | 3 | 4 | 5 |

Initially, the computer controls analyze all thirty-two ways that the player may hold and discard cards from this initial five card hand. Using Formula #1, the following results are achieved from this analysis:

| | |
|---|---|
| Discard strategy #1 | |
| Hand dealt: | KING♠ KING♦ TEN♥ JACK♥ QUEEN♥ |
| Cards held: | None |
| TEV = | 0.3008 |
| Discard strategy #2 | |
| Hand dealt: | KING♠ KING♦ TEN♥ JACK♥ QUEEN♥ |
| Cards held: | KING♠ |
| TEV = | 0.3316 |
| Discard strategy #3 | |
| Hand dealt: | KING♠ KING♦ TEN♥ JACK♥ QUEEN♥ |
| Cards held: | KING♠ |
| TEV = | 0.3316 |
| Discard strategy #4 | |
| Hand dealt: | KING♠ KING♦ TEN♥ JACK♥ QUEEN♥ |
| Cards held: | TEN♥ |
| TEV = | 0.2700 |
| Discard strategy #5 | |
| Hand dealt: | KING♠ KING♦ TEN♥ JACK♥ QUEEN♥ |
| Cards held: | JACK♥ |
| TEV = | 0.4321 |
| Discard strategy #6 | |
| Hand dealt: | KING♠ KING♦ TEN♥ JACK♥ QUEEN♥ |
| Cards held: | QUEEN♥ |
| TEV = | 0.4278 |
| Discard strategy #7 | |
| Hand dealt: | KING♠ KING♦ TEN♥ JACK♥ QUEEN♥ |
| Cards held: | KING♠ KING♦ |
| TEV = | 1.5264 |
| Discard strategy #8 | |
| Hand dealt: | KING♠ KING♦ TEN♥ JACK♥ QUEEN♥ |
| Cards held: | KING♠ TEN♥ |
| TEV = | 0.2572 |
| Discard strategy #9 | |
| Hand dealt: | KING♠ KING♦ TEN♥ JACK♥ QUEEN♥ |
| Cards held: | KING♠ JACK♥ |
| TEV = | 0.3982 |
| Discard strategy #10 | |
| Hand dealt: | KING♠ KING♦ TEN♥ JACK♥ QUEEN♥ |
| Cards held: | KING♠ QUEEN♥ |
| TEV = | 0.3982 |

-continued

| | |
|---|---|
| Discard strategy #11 | |
| Hand dealt: | KING♠ KING♦ TEN♥ JACK♥ QUEEN♥ |
| Cards held: | KING♦ TEN♥ |
| TEV = | 0.2572 |
| Discard strategy #12 | |
| Hand dealt: | KING♠ KING♦ TEN♥ JACK♥ QUEEN♥ |
| Cards held: | KING♦ JACK♥ |
| TEV = | 0.3982 |
| Discard strategy #13 | |
| Hand dealt: | KING♠ KING♦ TEN♥ JACK♥ QUEEN♥ |
| Cards held: | KING♦ QUEEN♥ |
| TEV = | 0.3982 |
| Discard strategy #14 | |
| Hand dealt: | KING♠ KING♦ TEN♥ JACK♥ QUEEN♥ |
| Cards held: | TEN♥ JACK♥ |
| TEV = | 0.3959 |
| Discard strategy #15 | |
| Hand dealt: | KING♠ KING♦ TEN♥ JACK♥ QUEEN♥ |
| Cards held: | TEN♥ QUEEN♥ |
| TEV = | 0.3776 |
| Discard: strategy #16 | |
| Hand dealt: | KING♠ KING♦ TEN♥ JACK♥ QUEEN♥ |
| Cards held: | JACK♥ QUEEN♥ |
| TEV = | 0.5115 |
| Discard strategy #17 | |
| Hand dealt: | KING♠ KING♦ TEN♥ JACK♥ QUEEN♥ |
| Cards held: | KING♠ KING♦ TEN♥ |
| TEV = | 1.4080 |
| Discard strategy #18 | |
| Hand dealt: | KING♠ KING♦ TEN♥ JACK♥ QUEEN♥ |
| Cards held: | KING♠ KING♦ JACK♥ |
| TEV = | 1.4080 |
| Discard strategy #19 | |
| Hand dealt: | KING♠ KING♦ TEN♥ JACK♥ QUEEN♥ |
| Cards held: | KING♠ KING♦ QUEEN♥ |
| TEV = | 1.4080 |
| Discard strategy #20 | |
| Hand dealt: | KING♠ KING♦ TEN♥ JACK♥ QUEEN♥ |
| Cards held: | KING♠ TEN♥ JACK♥ |
| TEV = | 0.3358 |
| Discard strategy #21 | |
| Hand dealt: | KING♠ KING♦ TEN♥ JACK♥ QUEEN♥ |
| Cards held: | KING♠ TEN♥ QUEEN♥ |
| TEV = | 0.3358 |
| Discard strategy #22 | |
| Hand dealt: | KING♠ KING♦ TEN♥ JACK♥ QUEEN♥ |
| Cards held: | KING♠ JACK♥ QUEEN♥ |
| TEV = | 0.4413 |
| Discard strategy #23 | |
| Hand dealt: | KING♠ KING♦ TEN♥ JACK♥ QUEEN♥ |
| Cards held: | KING♦ TEN♥ JACK♥ |
| TEV = | 0.3358 |
| Discard strategy #24 | |
| Hand dealt: | KING♠ KING♦ TEN♥ JACK♥ QUEEN♥ |
| Cards held: | KING♦ TEN♥ QUEEN♥ |
| TEV = | 0.3358 |
| Discard strategy #25 | |
| Hand dealt: | KING♠ KING♦ TEN♥ JACK♥ QUEEN♥ |
| Cards held: | KING♦ JACK♥ QUEEN♥ |
| TEV = | 0.4413 |

-continued

| | |
|---|---|
| Discard strategy #26 | |
| Hand dealt: | KING♠ KING♦ TEN♥ JACK♥ QUEEN♥ |
| Cards held: | TEN♥ JACK♥ QUEEN♥ |
| TEV = | 0.9177 |
| Discard strategy #27 | |
| Hand dealt: | KING♠ KING♦ TEN♥ JACK♥ QUEEN♥ |
| Cards held: | KING♠ KING♦ TEN♥ JACK♥ |
| TEV = | 1.2128 |
| Discard strategy #28 | |
| Hand dealt: | KING♠ KING♦ TEN♥ JACK♥ QUEEN♥ |
| Cards held: | KING♠ KING♦ TEN♥ QUEEN♥ |
| TEV = | 1.2128 |
| Discard strategy #29 | |
| Hand dealt: | KING♠ KING♦ TEN♥ JACK♥ QUEEN♥ |
| Cards held: | KING♠ KING♦ JACK♥ QUEEN♥ |
| TEV = | 1.2128 |
| Discard strategy #30 | |
| Hand dealt: | KING♠ KING♦ TEN♥ JACK♥ QUEEN♥ |
| Cards held: | KING♠ TEN♥ JACK♥ QUEEN♥ |
| TEV = | 0.8511 |
| Discard strategy #31 | |
| Hand dealt: | KING♠ KING♦ TEN♥ JACK♥ QUEEN♥ |
| Cards held: | KING♦ TEN♥ JACK♥ QUEEN♥ |
| TEV = | 0.8511 |
| Discard strategy #32 | |
| Hand dealt: | KING♠ KING♦ TEN♥ JACK♥ QUEEN♥ |
| Cards held: | KING♠ KING♦ TEN♥ JACK♥ QUEEN♥ |
| TEV = | 1.0000 |

The highest TEV for this example starting hand is 1.5264 when the player uses strategy #7 and holds the KING♠ and KING♦.

The player then selects which cards, if any, the player wishes to hold. The computer controls using Formula #1 calculate the expected value of the hand as played by the player (player TEV). The difference between the highest TEV and the player TEV is also calculated (highest TEV—player TEV). This difference is multiplied by the amount of the player's wager and the resultant amount is the error made by the player. If the player choose the best strategy when the player played the initial five card hand, then the player would be zero, but player's do not always play each hand using the best strategy.

For example, if the player were to use strategy #26 and hold the TEN♥ JACK♥ QUEEN♥ (hoping perhaps to draw a Royal Flush), the player's TEV would be 0.9177. The error made by the player is therefore the highest TEV minus the player's TEV (1.5264–0.9177) which equals 0.6087. The monetary value of the player's error is then the error times the amount of the player's wager. If the player were playing $1.00 per hand, the monetary value of the error on this hand would have been $0.6087. If the player were playing dollar video poker and wagering a maximum bet of $5.00 per hand, the monetary value of the error would have been $3.0435. If the player were playing 25¢ video poker and wagering a maximum bet of $1.25 per hand, the monetary value of the error would have been $0.7609.

The calculation of the player error for any other strategy for playing the hand would be done the same way. If the player had chosen strategy #7, then there would be no player error since strategy #7 is the best mathematical way to play the example hand.

This method of calculating player error can be used for any form of video poker (with or without wild cards and with or without one or more Jokers) and for any pay table used in video poker.

In the preferred embodiment of the present invention, the player error can be accumulated over one or more rounds of play and the accumulated error amount may be returned to the player in a variety of ways. It is also possible to combine a plurality of video draw poker gaming machines, such as bank of gaming machines at a particular gaming location, or even a plurality of gaming machines at a plurality of gaming locations and accumulate the monetary value of the error made at all of these gaming machines.

Since the errors made by the player are calculated and accrued as monetary amounts, any of a variety of ways can be used to return this error amount to the player. The player could simply be paid the amount of his error at the conclusion of each hand. The monetary value of the player's error for that hand could be displayed to the player (with or without a suitable DUMMY!! graphical representation) and the player could be paid the amount of his error. Using the above example, the $5 player would be paid $3.04 at the end of his hand, regardless of the outcome of the hand. Even if the player beat the odds and achieved the Royal Flush, the player would still be entitled to the return of his error since the player did not mathematically play the hand to its highest expected value.

Another more palatable way to return the error is to determine a threshold monetary value of accumulated error and, when the threshold monetary value is accrued, then pay the player the error. Any suitable threshold value may be used. For example, say the threshold value is $20.00. Whenever, the accumulated monetary value of the player error reaches $20.00, the payout mechanism on the gaming machine is actuated and $20.00 is paid to the player. This can be done by adding $20.00 worth of credits to the credit meter on the gaming machine or by activating the payout hopper and dispensing $20.00 worth of coins or tokens into the payout tray on the gaming machine. A suitable animation can be displayed on the video screen of the gaming machine to alert the player to what is occurring.

In a variation of this direct pay back scheme, the threshold amount can be a range of values, instead of one fixed value. For example, the threshold amount could be a range from say $15.00 to $25.00. A random number generator could be used to randomly select a value within the threshold range and when the monetary value of the accumulated player error reaches the randomly selected value, the amount is paid to the player, with the accompanying graphics display. Any suitable range of amounts can be used.

Another way of returning the monetary value of the accumulated error to the player is to use this error to fund one or more progressive jackpots. It is known to provide a progressive jackpot on a video poker gaming machine for certain poker hand rankings achieved by the player. For example, progressive jackpots have been provided for a Royal Flush, a Straight Flush, a Four-of-a-Kind and even a Full House and a Flush. Whenever the player achieves one of these hands, the player wins the amount of the progressive jackpot associated with the particular hand.

The monetary value of each player error could be added to the value of the progressive jackpot and thus the monetary value of the player's error would be returned to the player whenever the player achieved one of these winning hands.

If a plurality of gaming machines were linked together to one or more common progressive jackpots, each player could compete for not only the monetary value of his errors, but also the monetary value of all of the other player's errors.

The method of the present invention would equalize the game return on a gaming machine for all players and would increase the enjoyment of video draw poker since a player's skill level would not necessarily affect the game return. Novice players would have more playing time on a video draw poker gaming machine and would not need to feel intimidated if they did not know the optimal draw/discard strategy for playing each starting hand that was dealt to them. In a multi-machine carousel of video poker games, a player could increase his potential for a winning session because he could benefit from the player errors made by the other players at the commonly-linked gaming machines.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of calculating and using player error occurring during the play of a game of video draw poker in which a player makes a wager to be eligible to participate in the play of the game comprising:

a) displaying a starting five card hand to the player;

b) calculating the highest expected value for the starting hand;

c) the player holding none, one or more of the cards of the starting hand;

d) calculating the player's expected value of the starting hand based on the cards held by the player;

e) determining the player error by subtracting the player's expected value from the highest expected value;

f) determining the monetary value of the player error by multiplying the player error by the amount of the wager made by the player; and g) returning the monetary value of the player error to the player.

2. The method of claim 1 in which both the highest expected value and the player's expected value are calculated by the using the formula:

$$TEV_i = \sum_{n=1}^{N} P_{ni} \times Award_n$$

where:

$TEV_i$ is the Total Expected Value of awards paid for the $i^{th}$ discard strategy.

N is the winning hand types; this corresponds to the number of possible distinct winning categories.

$P_{ni}$ is the probability of winning the $n^{th}$ Award, given the dealt hand at the $i^{th}$ discard strategy.

$Award_n$ is the Pay for the $n^{th}$ winning combination.

3. The method of claim 1 in which the monetary value of the player error is returned to the player by paying the player the monetary value of the player error at the end of each hand.

4. The method of claim 1 in which the monetary value of the player error is returned to the player by accumulating the monetary value of the player error over a plurality of hands and returning the monetary value of the accumulated player error when the accumulated monetary value reaches a predetermined amount.

5. The method of claim 1 in which the monetary value of the player error is returned to the player by:

a) accumulating the monetary value of the player error over a plurality of hands;

b) establishing a range of monetary values;

c) randomly selecting a monetary value from the range of monetary values; and d) returning the monetary value of the accumulated player error when the accumulated monetary value reaches the randomly selected monetary value.

6. The method of claim 1 in which the monetary value of the player error is returned to the player by adding the monetary value of the player error to at least one progressive meter and returning the monetary value of the accumulated player error when the player achieves a hand combination for which the amount of the progressive meter is awarded to the player.

7. A method of calculating and using player error occurring during the play of a game of video draw poker in which a plurality of gaming machines are linked together and each player of a gaming machine makes a wager to be eligible to participate in the play of one of the gaming machines comprising:

a) displaying a starting five card hand to each player;

b) calculating the highest expected value for the starting hand;

c) the player holding none, one or more of the cards of the starting hand;

d) calculating the player's expected value of the starting hand based on the cards held by the player;

e) determining the player error by subtracting the player's expected value from the highest expected value;

f) determining the monetary value of the player error by multiplying the player error by the amount of the wager made by the player;

g) accumulating the monetary value of the player errors from each gaming machine; and g) returning the accumulated monetary value of the player error to one of the players.

8. The method of claim 7 in which both the highest expected value and the player's expected value are calculated by the using the formula:

$$TEV_i = \sum_{n=1}^{N} P_{ni} \times Award_n$$

where:

$TEV_i$ is the Total Expected Value of awards paid for the $i^{th}$ discard strategy.

N is the winning hand types; this corresponds to the number of possible distinct winning categories.

$P_{ni}$ is the probability of winning the $n^{th}$ Award, given the dealt hand at the $i^{th}$ discard strategy.

$Award_n$ is the Pay for the $n^{th}$ winning combination.

9. The method of claim 7 in which the accumulated monetary value of the player error is returned to one of the players by randomly selecting one of the players and paying that player the accumulated monetary value of the player error.

10. The method of claim 7 in which the accumulated monetary value of the player error is returned to one of the players by adding the monetary value of the player error to at least one progressive meter and returning the monetary value of the accumulated player error when one of the players achieves a hand combination for which the amount of the progressive meter is awarded to that player.

* * * * *